United States Patent [19]

Sakurai et al.

[11] 4,385,491
[45] May 31, 1983

[54] ENGINE MIXTURE CONTROL SYSTEM CONTROLLING PRIMARY AND SECONDARY AIR-FUEL MIXTURES

[75] Inventors: Kazuhiro Sakurai; Hiroshi Sawada; Kyo Hattori, all of Susono, Japan

[73] Assignee: Toyota Jidosha Kogyo Kabushiki Kaisha, Aichi, Japan

[21] Appl. No.: 221,889

[22] Filed: Dec. 31, 1980

[30] Foreign Application Priority Data

Jan. 8, 1980 [JP] Japan .................. 55-1039

[51] Int. Cl.³ ............................... F01N 3/22
[52] U.S. Cl. ........................ 60/276; 60/285; 60/289; 123/438; 123/440; 251/129; 251/139
[58] Field of Search .............. 60/276, 289, 285; 123/440, 438; 251/129, 139

[56] References Cited

U.S. PATENT DOCUMENTS

| | | | |
|---|---|---|---|
| 3,832,848 | 9/1974 | Scholl | 60/285 |
| 3,875,907 | 4/1975 | Wessel | 123/440 |
| 4,122,811 | 10/1978 | Bowler | 123/440 |
| 4,136,645 | 1/1979 | Ito | 123/440 |
| 4,149,376 | 4/1979 | Masaki | 60/276 |
| 4,246,875 | 1/1981 | Bier | 123/440 |
| 4,286,767 | 9/1981 | Hashimoto | 251/129 |

Primary Examiner—Douglas Hart
Attorney, Agent, or Firm—Stevens, Davis, Miller & Mosher

[57] ABSTRACT

An internal combustion engine includes an intake system, an exhaust system, and a mixture supply device which supplies primary fuel-air mixture into the intake system. An oxygen sensor assembly detects oxygen concentration at a certain point in the exhaust system and produces a first electrical signal which represents this concentration. A secondary air flow control circuit receives this first electrical signal and produces a second electrical signal according thereto. A secondary air supply system feeds secondary air into the exhaust system upstream of the aforementioned certain point at a flow rate controlled by the second electrical signal. A primary air/fuel ratio correction circuit receives either the first or the second electrical signal and based on it produces a primary mixture control electrical signal. This primary mixture control electrical signal is received by a mixture control system, which alters the primary air/fuel ratio of the mixture provided by the mixture supply device in accordance therewith.

2 Claims, 8 Drawing Figures

ENGINE MIXTURE CONTROL SYSTEM CONTROLLING PRIMARY AND SECONDARY AIR-FUEL MIXTURES

BACKGROUND OF THE INVENTION

The present invention relates to an air/fuel ratio control system for an internal combustion engine, and more particularly relates to an air/fuel ratio control system, for an internal combustion engine, which both provides control of the primary fuel-air mixture provided to the intake system of the engine by a mixture supply device, and also further provides control of the secondary air/fuel ratio of the exhaust gases of the engine emitted through the exhaust system thereof, by injection of secondary air into said exhaust system.

Nowadays, in the case of a modern internal combustion engine, it has become common and well known to fit a three way catalytic converter to the exhaust system of such an engine, in order effectively to reduce the levels of undesirable pollutants in the exhaust gases which are being emitted therethrough, before they are vented to the atmosphere. Such a per se well known three way catalytic converter is capable of reducing the levels of uncombusted combustible components such as HC and CO in the exhaust gases, at the same time as reducing the levels of nitrogen oxides (i.e., so called NOx) present in said exhaust gases, and such a three way catalytic converter is very effective in practice. However, in an internal combustion engine which is equipped with such a three way catalytic converter, it is very important that the air/fuel ratio of the exhaust gases which are being passed into the catalytic converter should be controlled within a certain rather narrow range around the stoichiometric air/fuel ratio, in order for the three way catalytic converter effectively to perform its three way function of purifying the exhaust gases not only of HC and CO, but also of NOx. In fact, if the air/fuel ratio of the exhaust gases entering the catalytic converter becomes lower than stoichiometric, i.e. richer than stoichiometric, by more than a certain small amount, then the performance of the three way catalytic converter for purifying the exhaust gases of HC and CO and other unburnt combustible components becomes poor, although the performance of the three way catalytic converter for purifying the exhaust gases of NOx remains quite good. On the other hand, if the air/fuel ratio of the exhaust gases entering the three way catalytic converter becomes higher than stoichiometric, i.e. leaner than stoichiometric, by more than a certain small amount, although the performance of the three way catalytic converter for purifying said exhaust gases of HC and CO, etc., still remains good, its performance for purifying said exhaust gases of NOx becomes rather poor.

Therefore it is normally practiced, in internal combustion engines equipped with such three way catalytic converters, to adjust the air/fuel ratio of the primary air/fuel mixture produced by the carburetor or other mixture supply device and supplied to the intake system of the internal combustion engine, i.e. the primary air/fuel ratio, to be substantially richer, i.e. smaller, than the stoichiometric air/fuel ratio. Thus, the internal combustion engine is operated in somewhat over rich condition. Then, secondary air is further injected into the exhaust manifold or the exhaust system of the internal combustion engine upstream of the three way catalytic converter, and the flow rate of this secondary air is controlled according to a signal produced by an oxygen sensor mounted within said exhaust system downstream of the secondary air injection point therein (and upstream of the three way catalytic converter), in such a way as to ensure that the air/fuel ratio of the exhaust gases entering into the three way catalytic converter, i.e. the secondary air/fuel ratio, is very close to stoichiometric. In other words, the primary air/fuel ratio of the fuel-air mixture provided by the mixture supply device is set to be richer, i.e. smaller, than the minimum air/fuel ratio which, during actual operation of the internal combustion engine, can result in production of exhaust gases which are at the stoichiometric condition, in order that it should always be the case that, whatever be the engine operational conditions, the exhaust gases, as they are emitted by the internal combustion engine, should be in a condition somewhat richer than stoichiometric, and therefore should be capable of being brought to the stoichiometric condition by the addition of secondary air.

However, it is often the case that the basic primary air/fuel ratio of the fuel-air mixture produced by the mixture supply device may become somewhat richer or leaner than anticipated, due to tolerances in the manufacture of the mixture supply device, or due to long term changes in the mixture supplying properties of the mixture supply device. Furthermore, changes in barometric pressure may also significantly affect the air/fuel ratio of the fuel-air mixture produced by the mixture supply device.

When such an unanticipated change in the air/fuel ratio of the mixture produced by the mixture supply device occurs, if this change is a change to the richer, i.e. to a smaller air/fuel ratio, then, although of course due to the injection of secondary air provided by the secondary air injection system into the exhaust gases of the engine before they enter the catalytic converter the secondary air/fuel ratio of the exhaust gases entering the three way catalytic converter is maintained to be in the aforesaid desirable narrow range around the stoichiometric condition, nevertheless the problems arise, first that the fuel economy of the internal combustion engine is deteriorated, and also that the exhaust gases entering the three way catalytic converter contain a rather large amount of uncombusted combustible components such as HC and CO and also rather large corresponding amounts of air, and the production of heat during the catalytic combustion of these components within the three way catalytic converter may well result in the overheating thereof.

On the other hand, if the aforesaid unanticipated change in the primary air/fuel ratio of the primary fuel-air mixture provided by the mixture supply device occurs in the direction of producing a leaner fuel-air mixture, i.e. in the direction of a larger air/fuel ratio, then the drivability of the vehicle incorporating the internal combustion engine is deteriorated, and, further, if the secondary air/fuel ratio of the exhaust gases is made so much leaner than previously that in fact the secondary air/fuel ratio becomes leaner than stoichiometric, then it becomes difficult for the catalytic converter to purify these exhaust gases of nitrogen oxides, because of course it is impossible for the injection of secondary air provided by the secondary air injecting system actually to make the exhaust gas secondary air/fuel ratio smaller.

SUMMARY OF THE INVENTION

Accordingly, the inventors of the present invention have come to the conclusion that it would be very desirable to provide controlled variation of the primary air/fuel ratio of the primary fuel-air mixture generated by the mixture supply device such as a carburetor of the internal combustion engine, by an air/fuel ratio control device, in addition to the provision of control of the secondary air/fuel ratio of the exhaust gases which is performed, as stated above, by injection of secondary air into the exhaust system of the internal combustion engine. According to this concept, the primary air/fuel ratio of the fuel-air mixture provided by the mixture control device should be controlled, so that said primary fuel-air mixture is maintained substantially richer than the stoichiometric air/fuel ratio, but not unduly rich.

Depending on this, the question arises as to what signal should be utilized for detecting the primary air/fuel ratio of the primary fuel-air mixture provided by the mixture supply device. In this connection, the inventors of the present invention have come to recognize the following facts.

During the time that a prior art secondary air injection system of the above described type incorporating an oxygen sensor operates, the secondary air/fuel ratio of the exhaust gases of the internal combustion engine cyclically varies, with a cycle period which typically represents the speed of progression of the exhaust gases through the exhaust system of the engine. In such a prior art system, the supply of secondary air alters the secondary air/fuel ratio of the exhaust gases, and the signal generated by the oxygen sensor detects this secondary air/fuel ratio of the exhaust gases and is used to control the amount of supply of secondary air in a feedback manner. Thus, from an instantaneous point of view, the signal generated by the exhaust gas oxygen sensor fitted to the exhaust system represents the secondary air/fuel ratio of the exhaust gases at that point of the exhaust system at that particular instant, i.e. the secondary air/fuel ratio of a mass of exhaust gas which was modified by injection of secondary air thereinto at a certain short characteristic time period before. On the other hand, if the signal generated by the exhaust gas oxygen sensor is considered in the large scale, over a certain rather long time period, it is representative of the primary air/fuel ratio of the primary fuel-air mixture generated by the mixture control device. This representation is conveyed by the average value, or the duty ratio, of the signal from the oxygen sensor.

For example, suppose that a common type of oxygen sensor is used which, when the secondary air/fuel ratio of the exhaust gases supplied to said oxygen sensor is smaller, i.e. richer, than the stoichiometric air/fuel ratio, produces a high voltage signal level, and, when the secondary air/fuel ratio of the exhaust gases provided to said oxygen sensor is greater, i.e. leaner, than the stoichiometric air/fuel ratio, produces a low voltage signal level, then let us consider a derived rectangular wave signal or pulse signal, which has a "1" signal value when the signal level from the oxygen sensor is greater than a predetermined signal level intermediate between the abovementioned high voltage signal level and the abovementioned low voltage signal level, and which has a "0" signal value when the level of the signal produced by the oxygen sensor is below said predetermined signal level. Over a certain time interval, the total time that said pulse signal assumes the "1" value, divided by the total time that said pulse signal assumes either the "1" value or the "0" value, i.e., the duty ratio of said pulse signal, is representative of the primary air/fuel ratio of the primary fuel-air mixture generated by the mixture supply device.

In fact, the aforesaid duty ratio becomes greater with decrease in the primary air/fuel ratio, i.e. with increasing richness of the primary fuel-air mixture provided by the mixture supply device, as may be seen from FIG. 7, which is a graph in which primary air/fuel ratio of the primary fuel-air mixture provided by the mixture supply device is shown as the abscissa, and the duty ratio of the pulse signal defined above is shown as the ordinate. The graph of FIG. 7 has been derived by a process of experiment. In other words, the richer is the primary air/fuel ratio of the primary fuel-air mixture, the greater is the duty ratio of the rectangular wave signal derived as explained above from the signal generated by the oxygen sensor. This is also the case with regard to the average level of the signal produced by the oxygen sensor itself; the smaller is the primary air/fuel ratio of the primary fuel-air mixture provided by the mixture supply device to the internal combustion engine, the greater is the average level of the output signal of the oxygen sensor.

Yet further, since the smaller, i.e. richer, is the primary air/fuel ratio of the primary fuel-air mixture, the greater is the amount of secondary air which is required to be supplied to the exhaust gases of the engine within the exhaust system thereof in order to make the secondary air/fuel ratio of these exhaust gases close enough to the stoichiometric air/fuel ratio for the three way catalytic converter to operate properly, therefore the control signal which is supplied to a secondary air injecting device for providing this proper amount of secondary air to be injected to these exhaust gases also changes in accordance with the primary air/fuel ratio. For example, when a secondary air injecting device is provided in which the amount of secondary air injected into the exhaust system of the internal combustion engine is proportionately increased according to increase in the value of a control signal, then the smaller is the primary air/fuel ratio of the primary fuel-air mixture supplied to the internal combustion engine, the greater is the average level of said control signal supplied to this secondary air injecting device.

Based upon this understanding by the present inventors, therefore, one object of the present invention is to provide an air/fuel ratio control system which controls the primary air/fuel ratio of the primary fuel-air mixture supplied to the internal combustion engine, in addition to the above described prior art control of the secondary air/fuel ratio of the exhaust gases of the engine by injection of secondary air thereinto.

A further object of the present invention is to provide such an air/fuel ratio control system, in which all the information contained in either the signal generated from the exhaust gas oxygen sensor or alternatively the signal which is produced for controlling a secondary air control device for injection of secondary air, and which is based upon the aforesaid signal from the exhaust gas oxygen sensor, is effectively utilized.

A further object of the present invention is to provide such an air/fuel ratio control system, in which changes in the primary air/fuel ratio of the primary fuel-air mixture supplied by the mixture supply device to the internal combustion engine are corrected.

A yet further object of the present invention is to provide such an air/fuel ratio control system, in which changes in the primary air/fuel ratio of the primary fuel-air mixture supplied by a mixture supply device, due to wear and/or aging of the mixture supply device, and/or manufacturing tolerances during construction of the mixture supply device, may be corrected.

A yet further object of the present invention is to provide such an air/fuel ratio control system, in which changes in the primary air/fuel ratio of the primary fuel-air mixture supplied by a mixture supply device, due to changes in barometric pressure, may be corrected.

According to the present invention, these and other objects are accomplished by, for an internal combustion engine comprising: (a) an intake system; (b) an exhaust system; and (c) a mixture supply device which supplies primary fuel-air mixture into said intake system: an air/fuel ratio control system, comprising: (d) an exhaust gas oxygen sensor assembly, which detects the concentration of oxygen at a measurement point of said exhaust system, and which produces a first secondary air flow control electrical signal representative thereof; (e) a secondary air flow control circuit, which receives supply of said first secondary air flow control electrical signal from said exhaust gas oxygen sensor assembly, and which according thereto produces a second secondary air flow control electrical signal; (f) a secondary air supply system, which receives supply of said second secondary air flow control electrical signal, and which feeds secondary air into said exhaust system upstream of said measurement point at a flow rate controlled by said second secondary air flow control electrical signal; (g) a primary air/fuel ratio correction circuit, which receives supply either of said first or of said second secondary air flow control electrical signal, and which, based thereon, produces a primary air/fuel ratio control electrical signal; and (h) a mixture control system, which receives supply of said primary air/fuel ratio control electrical signal from said primary air/fuel ratio correction circuit, and which alters the primary air/fuel ratio of the primary fuel-air mixture supplied by said mixture supply device, according to said primary air/fuel ratio control electrical signal; (i) whereby, according to the concentration of oxygen present at said measurement point of said exhaust system, said exhaust gas oxygen sensor assembly produces said first secondary air flow control electrical signal, which is processed by said secondary air flow control circuit to produce said second secondary air flow control electrical signal which controls said secondary air supply system to provide secondary air into said exhaust system in an amount suitable for bringing the secondary air/fuel ratio in the exhaust gases of said internal combustion engine near to stoichiometric, so as to promote three way catalytic converter action for purifying said exhaust gases, and further either said first or said second secondary air flow control electrical signal is supplied to said primary air/fuel ratio correction circuit, which according thereto produces said primary air/fuel ratio control electrical signal which controls said mixture control system so that it alters the primary air/fuel ratio of the primary fuel-air mixture provided by said mixture supply device to the internal combustion engine, in order to render it possible to moderate the amount of the uncombusted combustible components present in the exhaust gases of said internal combustion engine as well as the amount of secondary air fed thereinto in order to bring the secondary air/fuel ratio of the exhaust gases close to stoichiometric; whereby the intensity of the aforesaid three way catalytic action required for purifying the exhaust gases of these uncombusted combustible components may be reduced, thus reducing catalytic converter heating action, and the fuel consumption of the engine may be improved.

According to such a construction, in addition to the provision of secondary air into the exhaust gases in the exhaust system by the secondary air supply system under the control of the second secondary air flow control electrical signal produced by the secondary air flow control circuit, further the primary air/fuel ratio correction circuit controls the mixture control system so as to alter the primary air/fuel ratio of the primary fuel-air mixture supplied by the mixture supply device, according to either the first secondary air flow control electrical signal produced by the oxygen sensor assembly, or the second secondary air flow control electrical signal which is used for controlling the secondary air supply system. Thus, this control of primary air/fuel ratio is superimposed over the basic control of secondary air flow, and by the combination of these two systems for controlling fuel-air mixture for the internal combustion engine the air/fuel ratio of the exhaust gases which pass into a three way catalytic converter coupled to the exhaust system of the engine may be maintained in a narrow range around the stoichiometric condition, without however any need arising for keeping the primary air/fuel ratio of the primary fuel-air mixture provided by the mixture supply device at such a condition of richness that an undue amount of unburnt combustible components such as HC and CO should at any time be emitted by the internal combustion engine into the exhaust system thereof to be mixed with secondary air. Thereby, it is avoided that at any time a large amount of uncombusted combustible components and a large amount of secondary air should require to be catalytically processed by the three way catalytic converter; and thereby overheating of the catalytic converter is effectively prevented. Further, by the fact that at no time is it necessary to operate the internal combustion engine in extremely over rich mode, thereby the drivability of this internal combustion engine is improved, and also the fuel consumption thereof is rendered markedly better.

BRIEF DESCRIPTION OF THE DRAWINGS

The present invention will now be described with reference to several preferred embodiments thereof, and with reference to the accompanying drawings. It should be clearly understood, however, that the description of the embodiments, and the drawings, are all of them provided purely for the purposes of illustration and exemplification only, and are in no way to be taken as limitative of the scope of the present invention, which is to be defined strictly by the legitimate and proper scope of the accompanying claims. In the drawings:

DESCRIPTION OF THE PREFERRED EMBODIMENTS

The present invention will now be described in terms of several preferred embodiments thereof, and with reference to the drawings.

Figure 1:
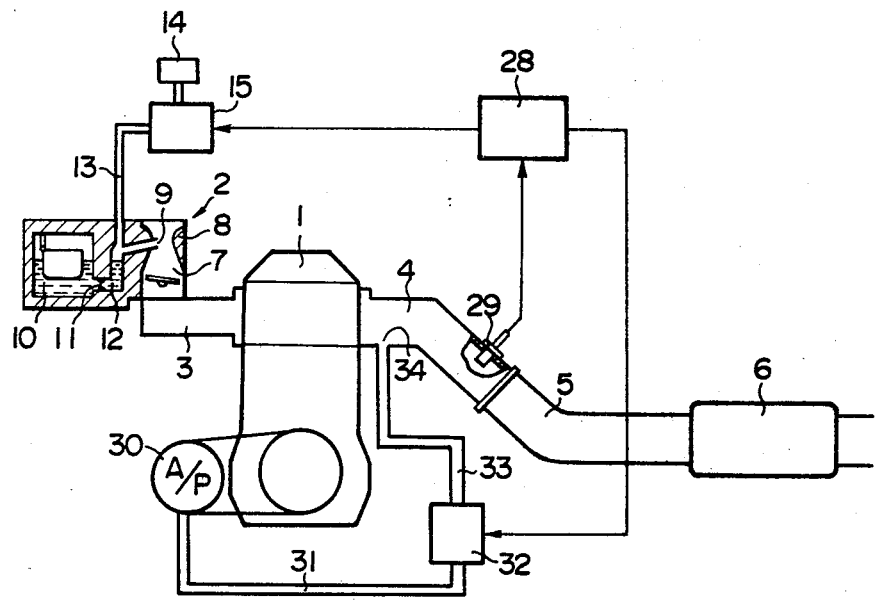
FIG. 1 is a part schematic part block diagrammatical part cross sectional view, showing schematically a first preferred embodiment of the air/fuel ratio control system according to the present invention, showing diagrammatically an internal combustion engine to which this air/fuel ratio control system is fitted, and also showing in sectional view a carburetor which provides primary fuel-air mixture into the intake system of said internal combustion engine.

In FIG. 1, there is shown an internal combustion engine, designated by the reference numeral 1, to which is fitted a first embodiment of the air/fuel ratio control system according to the present invention. This internal combustion engine 1 is supplied with primary air-fuel mixture by a carburetor 2, which is coupled to an intake manifold 3 of said internal combustion engine 1; and, further, said internal combustion engine 1 expels exhaust gases into an exhaust manifold 4, from which said exhaust gases pass into an exhaust pipe 5. After passing through the exhaust pipe 5, the exhaust gases enter into a three way catalytic converter 6, wherein they are purified of NOx, and further wherein uncombusted hydrocarbon components of the fuel, such as HC, CO, etc. are catalytically combined with available oxygen also contained in said exhaust gases in a per se well known way.

The carburetor 2 is shown in schematic cross section in FIG. 1. In the intake passage 7 of the carburetor 2 there is provided a venturi 8 which narrows said intake passage 7, and at the throat of this venturi 8 there opens a fuel nozzle 9 for spraying fuel into said venturi throat. The fuel nozzle 9 is supplied with liquid fuel such as gasoline from a float chamber 10 through a fuel passage 12, within which there is provided a metering jet 11 in order to control the flow rate of said liquid fuel through the fuel passage 12.

At an intermediate point of the fuel passage 12 there is joined the end of an air bleed passage 13, which leads to an air filter 14 which is open to the atmosphere. At an intermediate part of the air bleed passage 13 there is provided an air bleed flow rate control device 15.

Figure 2:
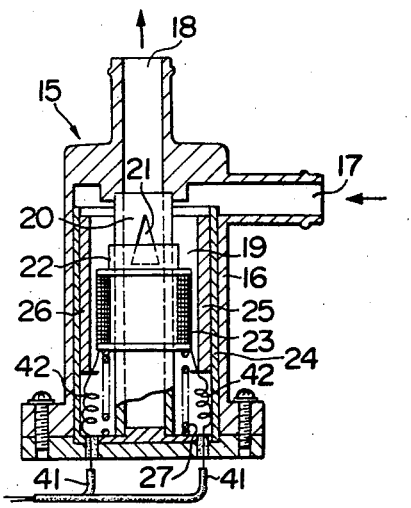
FIG. 2 is an axial cross sectional view of a particular preferred construction for an air bleed flow rate control device which is incorporated in a mixture control system which regulates the primary air/fuel ratio of the fuel-air mixture produced by the carburetor of the internal combustion engine shown in FIG. 1, according to the intensity of a primary air/fuel ratio control electrical signal supplied thereto.

In FIG. 2, a particular preferred construction for the air bleed flow rate control device 15 is shown. The function of the air bleed flow rate control device 15 is to control the rate of flow of bleed air through the air bleed passage 13, and the air bleed flow rate control device 15 is controlled by an electrical signal provided thereto through lead wires 41. The body of the air bleed flow rate control device 15 is formed as an essentially tubular housing 16, within which are formed an input port 17, an output port 18, and an essentially cylindrical valve chamber 19. The input port 17 is connected to that portion of the air bleed passage 13 which leads to the air filter 14, while the output port 18 is connected to that portion of the air bleed passage 13 which leads to the carburetor 2 and which opens into the fuel passage 12 which leads to the fuel nozzle 9.

The input port 17 is open to the valve chamber 19 at all times, while, on the other hand, the output port 18 is communicated with the inside of a hollow cylindrical support pipe 20 which runs from the bottom to the top of the valve chamber 19 of the air bleed flow rate control device 15, as may be seen in FIG. 2. In the side of the support pipe 20 there is formed a valve port 21, which in this particular construction is of a generally isosceles triangular shape, with its apex pointing upwards in the figure. Thus, via this valve port 21, the input port 17 is communicated to the output port 18, through the valve chamber 19 and the interior of the support pipe 20.

Around the outer cylindrical surface of the support pipe 20 there is fitted a slide sleeve 22 of a generally hollow cylindrical form. The inner cylindrical surface of the slide sleeve 22 closely conforms to the outer cylindrical surface of the support pipe 20, so that, as the slide sleeve 22 moves upwards and downwards in FIG. 2 with respect to the support pipe 20, the upper edge in the figure of the slide sleeve 22 moves to and fro across the valve port 21, and thus regulates the effective opening area of the valve port 21, i.e. regulates the flow resistance provided by the air bleed flow rate control device 15 between its input port 17 and its output port 18 via its valve chamber 19. On the outside of the slide sleeve 22 there is mounted a coil 23, electrical input connections to which are provided by two coiled lead wires 42 which extend downwards in the figure from said coil 23 so as to pass through sealed apertures in the base of the air bleed flow rate control device 15, and so as to be connected to the aforesaid lead wires 41. Within the valve chamber 19 of the air bleed flow rate control device 15 there are mounted two permanent magnets 25 and 26 which are located on opposite sides of the coil 23 as it is mounted on the slide sleeve 22. The coil 23 and the slide sleeve 22 are biased upwards in the figure by a compression coil spring 27.

The positioning and the polarities of the permanent magnets 25 and 26 and of the coil 23 are so arranged that, when actuating electrical energy is provided to the coil 23, it is urged thereby downwards in the figure against the biasing action upwards in the figure of the compression action of the compression coil spring 27. Therefore, according to progressive increase in the aforesaid actuating electrical energy provided to the coil 23, as said coil 23 is progressively moved downwards in the figure against the compression force of the compression coil spring 27, thereby the upper edge of the slide sleeve 22 progressively opens the valve port 21 more and more, and accordingly the flow resistance provided by the air bleed flow rate control device 15 between its input port 17 and its output port 18 is diminished; while, on the other hand, in response to progressive diminution in the actuating electrical energy provided to said coil 23 via the lead wires 41 and the coiled lead wires 47, the magnetic force urging the coil 23 and the slide sleeve 22 downwards in FIG. 2 against the compression force of the compression coil spring 27 becomes progressively weaker, so that progressively the coil 23 and the slide sleeve 22 coupled thereto move upwards in the figure so as more and more to cover the valve port 21 and thus so as to progressively increase the flow resistance provided by the air bleed flow rate control device 15 between its input port 17 and its ouput port 18.

The actuating electrical energy supplied to the air bleed flow rate control device 15 is provided by and is controlled by an electrical computer 28, as will be described in greater detail later.

Referring again to FIG. 1, the reference numeral 30 denotes an air pump, which is rotationally driven by the internal combustion engine 1, and which provides compressed atmospheric air to a conduit 31, through which it is conducted to a secondary air flow rate control device 32. From the secondary air flow rate control device 32, this compressed air flows through a conduit 33 to a secondary air injecting port 34 provided in the exhaust manifold 4 of the internal combustion engine 1, and thus this secondary air is squirted or injected into the exhaust manifold 4 through this secondary air injecting port 34, with the flow rate of this injection being controlled by the secondary air flow rate control device 32.

The secondary air flow rate control device 32 may be constructed as an electrically operated flow rate control valve which is directly driven by an electric signal produced by the computer 28, as will be explained later; for example, the secondary air flow rate control device 32 may be constructed as an enlarged version of the air bleed flow rate control device 15 which has been shown in detail in FIG. 2 and which has been described hereinabove; or, on the other hand, the secondary air flow rate control device 32 may be constructed as a fluid pressure actuated control valve, which is driven by a fluid pressure such as inlet manifold vacuum which is controlled by an electrically operated solenoid valve which is itself driven by an electric signal produced by the computer 28. Various constructions for such an electrically controlled secondary air flow rate control device 32 are per se well known, and accordingly further description thereof will not be given here in the interests of brevity of explanation.

Downstream of the secondary air injecting port 34 in the exhaust manifold 4 there is mounted an oxygen sensor 29, which produces an electrical voltage signal corresponding to the secondary air/fuel ratio of the exhaust gases flowing past it through the exhaust manifold 4, i.e. corresponding to the air excess ratio of these exhaust gases. The electric voltage signal produced by the oxygen sensor 29 is sent to the computer 28 as an input.

Figure 3:
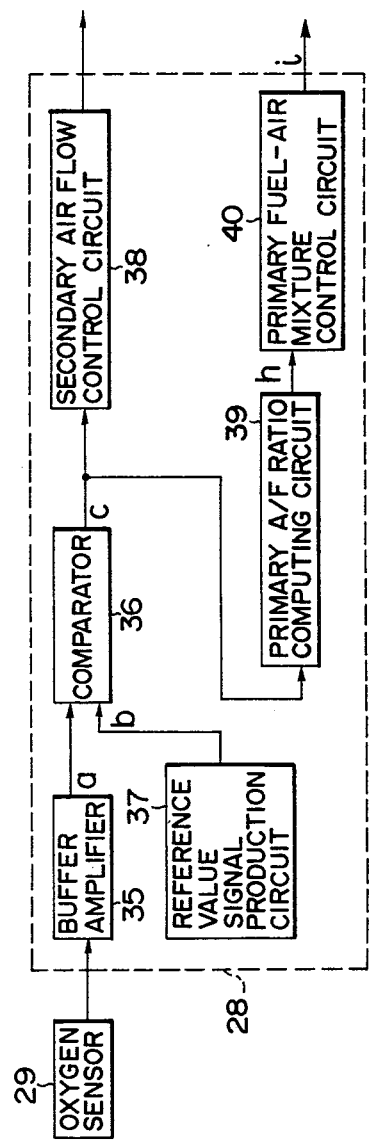
FIG. 3 is a block diagrammatical view showing part of the internal structure of a computer which is denoted by reference numeral 28 in FIG. 1, and also showing an oxygen sensor which feeds an input signal to said computer 28 in this first preferred embodiment of the air/fuel ratio control system according to the present invention; a primary air/fuel ratio correction circuit incorporated in this computer receives its input signal from the output of a comparator denoted by the reference numeral 36 in this figure.

In FIG. 3, in block diagram form, there is shown the basic internal structure of the computer 28, which in this first preferred embodiment is an analog computer. The signal from the oxygen sensor 29 is fed into the computer 28, and is received by a buffer amplifier 35 which, after converting its impedance, outputs a wave signal, like for instance the wave signal a in FIG. 4.I. This signal a is fed to the comparator 36, and is therein compared with a reference signal b produced by a reference value signal production circuit 37. This reference signal b represents a medium value for the signal a, and may be exemplarily seen in FIG. 4.I. The output signal from the comparator 36, i.e. the result of the above comparison, is a pulse signal such as is exemplarily shown by the pulse signal c in FIG. 4.II. Thus, the assembly incorporating the oxygen sensor 29, the buffer amplifier 25, the reference value signal production circuit 37, and the comparator 36 may be said to constitute an exhaust gas oxygen sensor assembly, which detects the concentration of oxygen at the measurement point within the exhaust manifold 4 of the internal combustion engine 1 at which the oxygen sensor 29 is mounted, and which produces a first secondary air flow control electrical signal representative thereof, which in this embodiment is a pulse signal which takes on high or low signal level values, according to whether the concentration of oxygen in the exhaust gases of said internal combustion engine 1 at said measurement point in said exhaust system is on the one side or the other of the predetermined value specified by the value of the reference signal b generated by the reference value signal production circuit 37.

The first secondary air flow control electrical signal c output from the comparator 36 is supplied to a secondary air flow control circuit 38. This secondary air flow control circuit 38 may be of a per se well known type, which after performing various calculation processes and the like produces a second secondary air flow control electrical signal d and supplies said second secondary air flow control electrical signal d as a controlling signal for the secondary air flow rate control device 32. This system of driving the secondary air flow rate control device 32 by the signal d output from the secondary air flow control circuit 38, according to the first secondary air flow control electrical signal c which is produced by the oxygen sensor assembly and which is received by the secondary air flow control circuit 38, is per se well known, as stated above.

According to the present invention, in this embodiment the first secondary air flow control electrical signal c produced as an output of the comparator 36 is also fed to a primary air/fuel ratio computing circuit 39 as an input signal. Based upon this input signal, the primary air/fuel ratio computing circuit 39 produces an output signal h, which, after being further processed by a primary air/fuel mixture control circuit 40, is output as a primary air/fuel ratio control electrical signal i and is transmitted to the air bleed flow rate control device 15, in order to control said air bleed flow rate control device 15.

Figure 4:
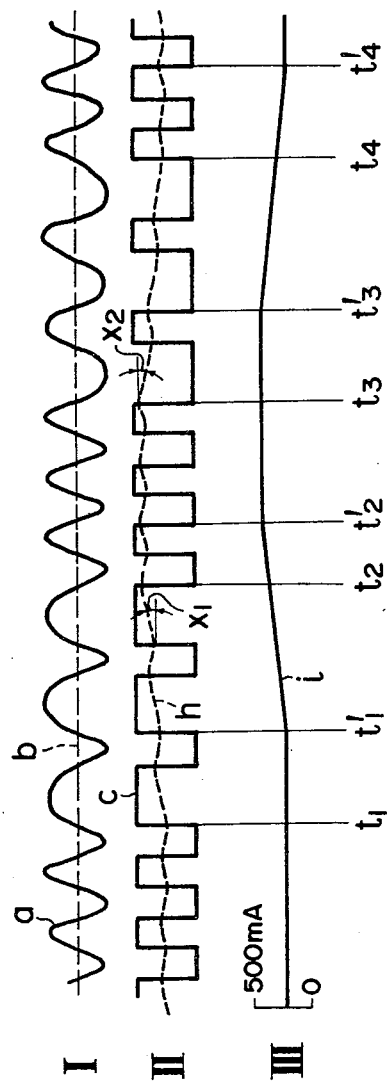
FIG. 4 is a set of three time series diagrams, in which time is the abscissa and wave amplitude is the ordinate, showing a particular example of various electrical signals produced within the first embodiment of the air/fuel ratio control system according to the present invention shown in FIGS. 1, 2, and 3.

In more detail, in this particular first preferred embodiment the primary air/fuel ratio computing circuit 39 integrates the average value of the secondary air flow control electrical signal supplied to it, and in particular integrates with respect to time the difference between said pulse signal c supplied from the comparator 36 and an intermediate signal level value midway between the high signal level value and the low signal level value of said pulse signal c. The result of this integration is a signal as exemplarily shown in FIG. 4.II by the line h. According to various different possible constructions, the primary air/fuel ratio computing circuit 39 may comprise various known types of integrators using for example RC circuits or operational amplifiers. In other words, the signal h represents the cumulative average value of the pulse signal c produced as output from the comparator 36. As stated previously, in the section of this specification entitled "SUMMARY OF THE INVENTION," this signal h is representative of the cumulative average value of the air/fuel ratio of the primary air-fuel mixture produced by the carburetor 2. The signal h is fed to a primary fuel-air mixture control circuit 40, which in this embodiment is a smoothing filter circuit. The output of this primary fuel-air mixture control circuit 40 is a current signal, and is shown in FIG. 4.II as the signal i. This signal i is a smoothed and averaged signal produced from the signal h.

If the rate of integration with respect to time of the pulse signal c provided by the primary air/fuel ratio computing circuit 39 is the same, both when said pulse signal c is in its high signal state, and when said pulse signal c is in its low signal state, i.e. if the tangents of the angles $x_1$ and $x_2$ are equal, then, when the duty ratio of the pulse signal c is equal to 0.5, the average value of the signal h neither increases nor decreases from the start of one cycle of the pulse signal c to the start of the next cycle thereof. In other words, the value representing the average value of the pulse signal c provided by the integrating circuit incorporated in the primary air/fuel ratio computing circuit 39 does not change with time, on the large scale. On the other hand, if the rates of integration with respect to time used during the integrating operation by the primary air/fuel ratio computing circuit 39 of the pulse signal c, i.e. the tangents of the angles $x_1$ and $x_2$, are not the same, then the value for the duty ratio of the pulse signal c, at which the value of the signal h at the start of each cycle of the pulse signal c is equal to the value of the signal h at the start of the next cycle of the pulse signal c, is not 0.5, but is some different duty ratio value, according to the ratio of the tangents of the angles $x_1$ and $x_2$. Henceforth, this value for the duty ratio of the pulse signal c, at which, depending upon the aforesaid rates of integration with respect to time provided by the primary air/fuel ratio computing circuit 39 both when the pulse signal c is at its high signal level value and when the pulse signal c is at its low signal level value, the value of said signal h is the same at the start of each cycle of the pulse signal c as it is at the start of the next cycle of the pulse signal c, i.e. at which the pulse signal h does not increase or decrease gradually with cycle repetition of the pulse signal c, will be called the equilibrium duty ratio value for the pulse signal c.

Generally, in order for the air/fuel ratio control system according to the present invention to operate properly, it is desirable that the rate with respect to time of the integration of the pulse signal c performed by the primary air/fuel ratio computing circuit 39, in order to produce the signal h, should be fairly slow, and, in particular, should be very much slower than the characteristic response time of the secondary air flow control circuit 38. In other words, the tangents of the angles $x_1$ and $x_2$ should be rather small, and, depending upon this, the maximum slope of the signal h, and the maximum slope of the signal i derived therefrom, should be rather small.

The operation of the air/fuel ratio control system according to the first preferred embodiment of the present invention as described above will now be explained; and, during this explanation, it should be understood that in the first preferred embodiment of the present invention described above the angles $x_1$ and $x_2$ are substantially equal to one another, and therefore their tangents are substantially equal; in other words, in this first embodiment the equilibrium duty ratio value of the pulse signal c is 0.5.

First, suppose that the internal combustion engine 1 is operating in some stable engine operational condition, in which condition the secondary air supply system, comprising the air pump 30, the conduit 31, the secondary air flow rate control device 32, the conduit 33, and the secondary air injecting port 34, is functioning in a mode of providing a certain substantially constant flow amount of injected secondary air into the exhaust manifold 4 of the internal combustion engine 1, upstream of the oxygen sensor 29. Further, suppose that in this initial starting state the duty ratio of the pulse signal c which is being produced by the aforesaid exhaust gas oxygen sensor assembly is at the current time 0.5; in other words, the pulse signal c is at its high level signal value for approximately half the time, and is at its low signal level value for approximately the other half of the time. It is assumed here that this will indicate an engine operational condition in which a primary air-fuel mixture of such a certain acceptable air/fuel ratio value richer than stoichiometric is being supplied by the carburetor 2 to the internal combustion engine 1 that a certain amount, but not an unacceptable amount, of unburnt hydrocarbons such as HC and CO are being emitted from the internal combustion engine 1 into the exhaust manifold 4, and are being balanced by the aforesaid certain acceptable amount of secondary air which is being provided through the secondary air flow rate control device 32 from the air pump 31, and that this acceptable value of over richness of the primary air-fuel mixture is not so high as to cause undesirable overheating in the three way catalytic converter 6, or unacceptably deteriorated fuel economy of the internal combustion engine 1.

In this engine operational condition, as shown by the first parts of the lines a, b, c, h, and i in FIG. 4 which represent the various signals present within the computer 28, the value of the signal h at the starting point of each cycle of the pulse signal c is the same as the value of said signal h at the starting point of the next cycle of the pulse signal c; in other words, the overall level of the signal h does not change with time. According to this, therefore, the primary air/fuel ratio control electrical signal i is also substantially constant with time, on the large scale, and has slope substantially zero. Accordingly, the amount of bleed air provided to the fuel passage 12 in the carburetor 2 via the air bleed passage 13 as controlled by the air bleed flow rate control device 15 remains constant; in other words, the slide sleeve 22 of the air bleed flow rate control device 15 is maintained in a constant position with respect to the valve port 21 of the support pipe 20.

Suppose now that at the time point $t_1$ shown in FIG. 4 the operational conditions of the internal combustion engine 4 change, so that, in the shown case, the primary air/fuel ratio of the air-fuel mixture provided by the carburetor 2 becomes smaller, i.e. richer, than the above mentioned certain acceptable primary air/fuel ratio value, so that the amount of uncombusted hydrocarbons such as HC and CO in the exhaust gases of the internal combustion engine 1 present within the exhaust manifold 4 thereof becomes higher, i.e. so that the secondary air/fuel ratio of these exhaust gases becomes smaller, i.e. becomes richer. In this case, as explained previously, quickly the secondary air flow control circuit 38, based upon a quick change in the pulse signal c fed thereto from the comparator 36, will activate the secondary air flow rate control device 32 so as to provide a greater amount of secondary air into the exhaust system 4 upstream of the oxygen sensor 29, so that a proper increased amount of secondary air is provided for catalyzing this increased amount of unburnt hydrocarbons such as HC and CO within the three way catalytic converter 6. If this increased amount of uncombusted hydrocarbons, and of secondary air, were to continue to be emitted into, and to be catalytically combined in, the three way catalytic converter 6, then the three way catalytic converter 6 would quite possibly soon overheat. However, at this time the duty ratio of the pulse signal c will increase, as explained above, even though the final secondary air/fuel ratio of the exhaust gases of the internal combustion engine 1 within the exhaust manifold 4 thereof has been returned to acceptably close to the stoichiometric condition, as explained above. Therefore, the level of the signal h, which represents the integrated value over time of the pulse signal c, gradually now starts to increase. In other words, the value of the integrated signal h at the start of each cycle of the pulse signal c is now greater than it was at the start of the previous cycle of the pulse signal c. Based upon this, at the time point $t_1'$ the value of the smoothed signal i, i.e. of the primary air/fuel ratio control electrical signal i, starts gradually to increase. As explained above, according to the present invention, this increase of the primary air/fuel ratio control electrical signal i should be quite gradual, and should be very much slower than the characteristic response time of the secondary air flow control circuit 38.

Figure 7:
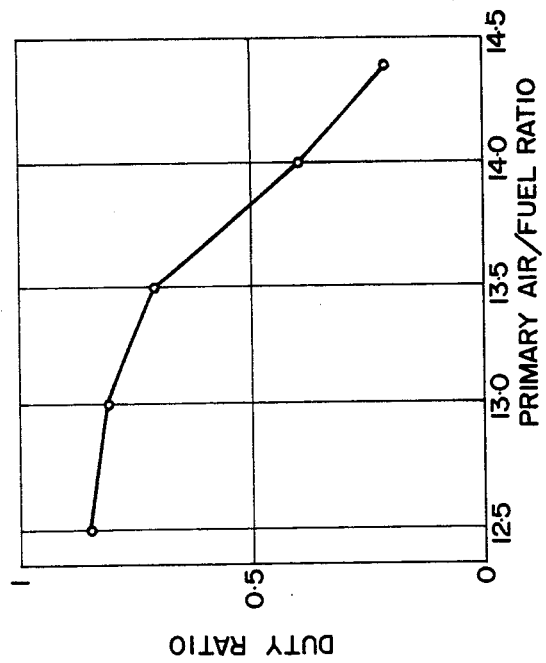
FIG. 7 is a graph, in which primary air/fuel ratio is the abscissa, and duty ratio is the ordinate, showing the variation behavior of the duty ratio of a pulse signal received from an oxygen sensor which is sensing the concentration of oxygen in the exhaust gases of an internal combustion engine, with respect to variation of the primary air/fuel ratio of the primary fuel-air mixture provided to the engine, and demonstrating that, the lower is the primary air/fuel ratio, the higher is the duty ratio of said oxygen sensor signal.

According to this gradual increase of the primary air/fuel ratio control electrical signal i, the magnetic attraction produced thereby in the coil 23 of the air bleed flow rate control device 15 is gradually increased, and according thereto the coil 23 and the slide sleeve 22 coupled thereto gradually start moving progressively downward as seen in FIG. 2, against the compression force of the compression coil spring 27 which is overcome, so that the valve port 21 is progressively opened more and more, i.e. so that the resistance presented to fluid flow through the air bleed passage 13 by the air bleed flow rate control device 15 is progressively decreased. Thereby, the amount of air bled in through the air filter 14 and the air bleed passage 13 to the intermediate point in the fuel passage 12 to which said air bleed passage 13 joins is progressively increased, and according to this increase of air bleed amount the primary air/fuel ratio of the air-fuel mixture provided by the carburetor 2 to the internal combustion engine 1 is progressively increased, i.e. said primary air-fuel mixture is weakened. Of course, in step with this weakening of the primary air-fuel mixture supplied by the carburetor 2, the secondary air flow rate control device 32 is required by the secondary air flow control circuit 38 to provide progressively less and less secondary air to be injected through the secondary air injecting port 34 into the exhaust manifold 4. Further, as has been explained previously with reference to FIG. 7, as the primary air/fuel ratio of the air-fuel mixture provided by the carburetor 2 gradually increases, i.e. as the primary air-fuel mixture becomes weaker, the duty ratio of the pulse signal c output from the comparator 36 gradually decreases, until at the time point $t_2$ as seen in FIG. 4 this duty ratio of the pulse signal c again becomes equal to 0.5 which is the equilibrium duty ratio value in this embodiment. In other words, at this time the air/fuel ratio of the primary air-fuel mixture provided by the carburetor 2 has been returned to an appropriate and suitable air/fuel ratio, acceptably and desirably somewhat richer than stoichiometric but not unduly so, and thus at this time a moderate amount of unburnt hydrocarbons is being emitted from the internal combustion engine 1 in its exhaust gases, according to the above described somewhat over rich operation of the internal combustion engine 1, and this relatively moderate amount of uncombusted hydrocarbons such as HC and CO is being at this time matched by a proper amount of secondary air which is being provided by the air pump 30 through the conduits 31 and 33, under control of the secondary air flow rate control device 32 as controlled by the secondary air flow control circuit 38, and together these uncombusted hydrocarbons and the injected secondary air are being catalytically combusted in the three way catalytic converter 6, and because of their relatively moderate amount do not produce sufficient heat within the three way catalytic converter 6 to cause undue over heating thereof.

At this time, when as explained above the duty ratio of the pulse signal c has been returned to the equilibrium duty ratio value 0.5, i.e. at the time point $t_2$, then shortly subsequently, at the time point $t_2'$, as explained above with reference to the operation of the integrating function of the primary air/fuel ratio computing circuit 39, the signal h ceases to progressively increase. Accordingly, at this time point $t_2'$ the primary air/fuel ratio control electrical signal i again becomes substantially constant, i.e. of substantially zero slope, and accordingly the gradual descending movement in FIG. 2 of the coil 23 and the slide sleeve 22 coupled thereto in the air bleed flow rate control device 15 is stopped. Accordingly, from the time point $t_2'$ onwards, the internal combustion engine 1 again operates in a steady state, with the amount of air bleed provided for the carburetor 2 via the air bleed flow rate control device 15 now stabilized at its increased amount as governed by the new, lower position of the slide sleeve 22 in FIG. 2 with respect to the valve port 21

Similarly, suppose now that at the time point $t_3$ shown in FIG. 4 the operational conditions of the internal combustion engine 1 change, so that the primary air/fuel ratio of the air-fuel mixture provided by the carburetor 2 now becomes larger, i.e. leaner, than the above mentioned certain acceptable primary air/fuel ratio value, so that the amount of uncombusted hydrocarbons such as HC and CO in the exhaust gases of the internal combustion engine 1 present within the exhaust manifold 4 thereof becomes lower, i.e. so that the secondary air/fuel ratio of these exhaust gases becomes larger, i.e. becomes leaner. In this case, as explained previously, quickly the secondary air flow control circuit 38, based upon a quick change in the pulse signal c fed thereto from the comparator 36, will activate the secondary air flow rate control device 32 so as to provide a lesser amount of secondary air into the exhaust system 4 upstream of the oxygen sensor 29, so that a proper decreased amount of secondary air is provided for catalyzing this decreased amount of unburnt hydrocarbons such as HC and CO within the three way catalytic converter 6. At this time the duty ratio of the pulse signal c will decrease, as explained above, even though the final secondary air/fuel ratio of the exhaust gases of the internal combustion engine 1 within the exhaust manifold 4 thereof has been returned to acceptably close to the stoichiometric condition, as explained above. Therefore, the level of the signal h, which represents the integrated value over time of the pulse signal c, gradually now starts to decrease. In other words, the value of the integrated signal h at the start of each cycle of the pulse signal c is now less than it was at the start of the previous cycle of the pulse signal c. Based upon this, at the time point $t_3'$ the value of the smoothed signal i, i.e. of the primary air/fuel ratio control electrical signal i, starts gradually to decrease. As explained above, according to the present invention, this decrease of the primary air/fuel ratio control electrical signal i should be quite gradual, and should be very much slower than the characteristic response time of the secondary air flow control circuit 38.

According to this gradual decrease of the primary air/fuel ratio control electrical signal i, the magnetic attraction produced thereby in the coil 23 of the air bleed flow rate control device 15 is gradually decreased, and according thereto the coil 23 and the slide sleeve 22 coupled thereto gradually start moving progressively upward as seen in FIG. 2, due to the biasing compression force of the compression coil spring 27, so that the valve port 21 is progressively opened less and less, i.e. so that the resistance presented to fluid flow through the air bleed passage 13 by the air bleed flow rate control device 15 is progressively increased. Thereby, the amount of air bled in through the air filter 14 and the air bleed passage 13 to the intermediate point in the fuel passage 12 to which said air bleed passage 13 joins is progressively decreased, and according to this decrease of air bleed amount the primary air/fuel ratio of the air-fuel mixture provided by the carburetor 2 to the internal combustion engine 1 is progressively decreased, i.e. said primary fuel-air mixture is enriched. Of course, in step with this enriching of the primary air-fuel mixture supplied by the carburetor 2, the secondary air flow rate control device 32 is required by the secondary air flow control circuit 38 to provide progressively more and more secondary air to be injected through the secondary air injecting port 34 into the exhaust manifold 4. Further, as has been explained previously with reference to FIG. 7, as the primary air/fuel ratio of the air-fuel mixture provided by the carburetor 2 gradually decreases, i.e. as the primary air-fuel mixture becomes richer, the duty ratio of the pulse signal c output from the comparator 36 gradually increases, until at the time point $t_4$ as seen in FIG. 4 this duty ratio of the pulse signal c again becomes equal to 0.5, which is the equilibrium duty ratio value in this embodiment. In other words, at this time the air/fuel ratio of the primary air-fuel mixture provided by the carburetor 2 has been returned to an appropriate and suitable air/fuel ratio, acceptably and desirably somewhat richer than stoichiometric but not unduly so, and thus at this time a moderate amount of unburnt hydrocarbons is being emitted from the internal combustion engine 1 in its exhaust gases, according to the above described somewhat over rich operation of the internal combustion engine 1, and this relatively moderate amount of uncombusted hydrocarbons such as HC and CO is being at this time matched by a proper amount of secondary air which is being provided by the air pump 30 through the conduits 31 and 33, under control of the secondary air flow rate control device 32 as controlled by the secondary air flow control circuit 38, and together these uncombusted hydrocarbons and the injected secondary air are being catalytically combusted in the three way catalytic converter 6, and because of their relatively moderate amount do not produce sufficient heat within the three way catalytic converter 6 to cause undue overheating thereof.

At this time, when as explained above the duty ratio of the pulse signal c has been returned to the equilibrium duty ratio value 0.5, i.e. at the time point $t_4$, then shortly subsequently, at the time point $t_4'$, as explained above with reference to the operation of the integrating function of the primary air/fuel ratio computing circuit 39, the signal h ceases to progressively decrease. Accordingly, at this time point $t_4'$ the primary air/fuel ratio control electrical signal i again becomes substantially constant, i.e. of substantially zero slope, and accordingly the gradual ascending movement in FIG. 2 of the coil 23 and the slide sleeve 22 coupled thereto in the air bleed flow rate control device 15 is stopped. Accordingly, from the time point $t_4'$ onwards, the internal combustion engine 1 again operates in a steady state, with the amount of air bleed provided for the carburetor 2 via the air bleed flow rate control device 15 now stabilized at its decreased amount as governed by the new, higher position of the slide sleeve 22 in FIG. 2 with respect to the valve port 21.

Figure 5:
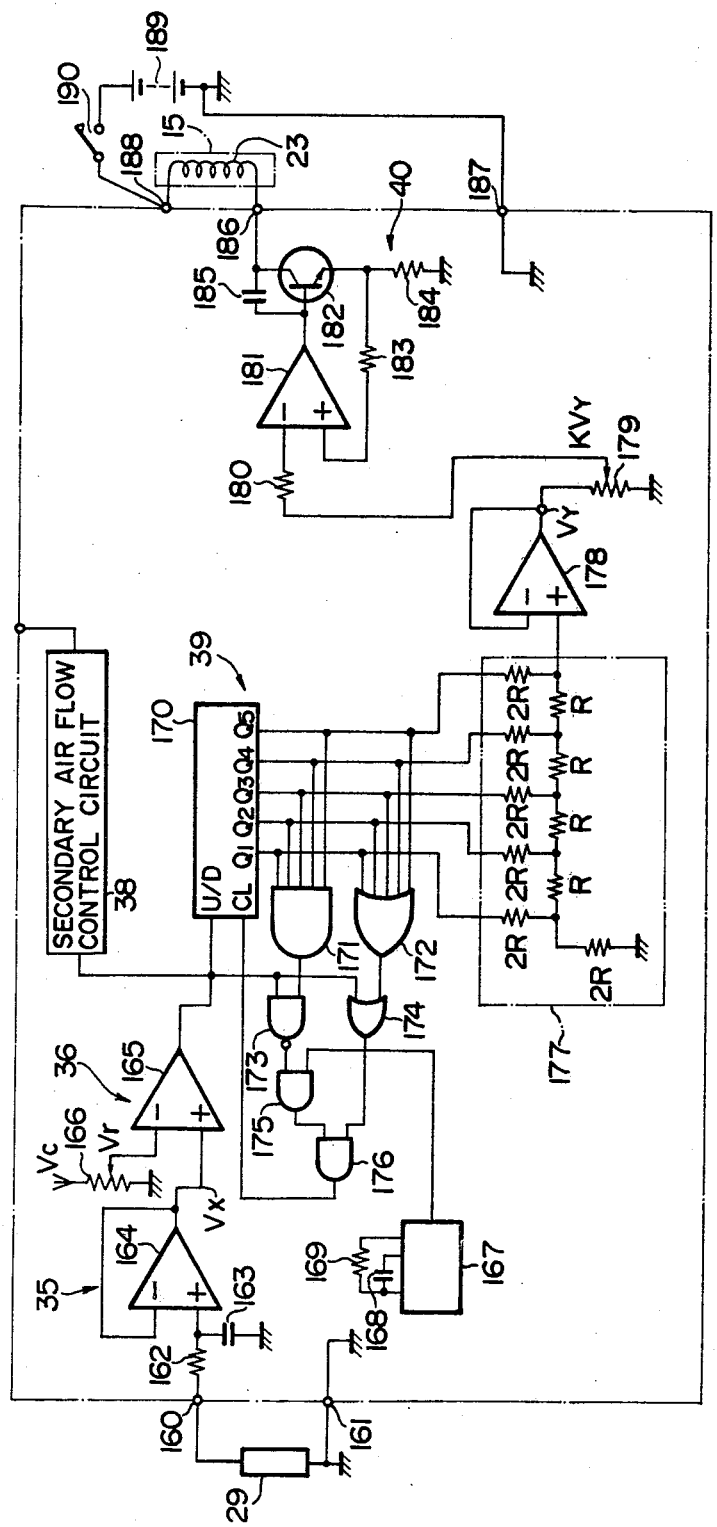
FIG. 5 is an electrical circuit diagram, given in part block diagrammatical form, showing a more concrete structure of the computer 28 which appears in FIGS. 1 and 3, and also showing details of the electrical connections to the oxygen sensor 29 and to the air bleed flow rate control device shown in FIG. 2.

Now, the concrete structure of the computer 28 in this first preferred embodiment will be more particularly described. Referring to FIG. 5, a schematic circuit diagram for the computer 28, and for certain devices connected thereto, is shown in detail.

The input terminal 160 of the computer 28 is connected to the output of the oxygen sensor 29, while the input terminal 161 of the computer 28 is connected to the ground terminal of the oxygen sensor 29. The wires which lead from the oxygen sensor 29 to the computer 28 are constructed as shielded wires. Within the computer 28, the input terminal 160 is connected to the non inverting input terminal of a buffer amplifier 164 via a resistor 162. Further, between this non inverting input terminal of the buffer amplifier 164 and the ground there is connected a capacitor 163, in order to suppress noise. The output of the buffer amplifier 164 is connected to the inverting input terminal thereof. The buffer amplifier 164 may be, for example, an RCA integrated circuit serial no. CA3130.

The output of the buffer amplifier 164 is also connected to the non inverting input of a comparator 165. The inverting input of this comparator 165 is connected to the variable terminal of a variable resistor 166, one of the fixed terminals of which is connected to the ground, while the other is supplied with a constant voltage Vc.

The assembly comprising the buffer amplifier 164 and its associated resistor 162 and capacitor 163 corresponds to the block 35 in the schematic block diagram shown in FIG. 3; the comparator 165 in FIG. 5 corresponds to the comparator 36 in FIG. 3; and the arrangement comprising the variable resistor 166 in FIG. 5 corresponds to the reference value signal production circuit shown as a block by the reference numeral 37 in FIG. 3. The output signal of the comparator 165 corresponds, therefore, to the signal shown by the line c in FIG. 4.II.

Within the computer 28, the pulse signal output c of the comparator 165 is supplied both as an input to a secondary air flow control circuit 38, which as explained above is in this embodiment of a per se well known sort, and which therefore will not be described further herein in the interest of brevity of explanation, and is also supplied to the U/D input of an up/down counter 170, which is comprised within a circuit which corresponds to the primary air/fuel ratio computing circuit 39 shown as a block in FIG. 3.

In more detail, within the primary air/fuel ratio computing circuit 39 there is comprised an astable multivibrator 167, which may, for example, be an RCA integrated circuit serial no. CD4047. This integrated circuit may be used as an astable multivibrator by supplying a constant voltage to its terminals 4, 5, 6, and 14, by grounding its terminals 7, 8, 9, and 12, by connecting a capacitor 168 between the terminals 1 and 3 of the integrated circuit, and by also connecting a resistor 169 between the terminals 2 and 3 thereof. Thus, as is per se well known in the art, the oscillating frequency of the astable multivibrator thus constituted by the integrated circuit 167 is determined by the time constant defined by the capacitor 168 and the resistor 169.

The output of the astable multivibrator 167 is connected to one of the inputs of an AND gate 175, and the output of this AND gate 175 is connected to one of the inputs of another AND gate 176. The output of the AND gate 176 is connected to the CL terminal of the up/down counter 170.

This up/down counter 170, which in this embodiment may be constructed out of two units of the RCA integrated circuit serial no. 4029 in a per se well known way, is constructed as a binary up/down counter. The digit outputs Q1, Q2, Q3, Q4 and Q5 of the up/down counter 170 are connected in an appropriate order to a R/2R ladder network 177. Further, the five inputs of a five input AND gate 171 are connected one to each of these outputs Q1, Q2, Q3, Q4, and Q5, and, further, the five inputs of a five input OR gate 172 are connected one to each of these outputs Q1, Q2, Q3, Q4, and Q5. The output of the five way AND gate 171 is supplied as one of the inputs to a NAND gate 173, and the output of the five way OR gate 172 is supplied as one of the inputs to an OR gate 174; the other input of this NAND gate 173 and the other input of this OR gate 174 are connected so as to be supplied with the pulse signal c provided as the output of the comparator 36. The output of the NAND gate 173 is supplied as the other input of the AND gate 175 previously mentioned, and the output of the OR gate 174 is supplied as the other input of the AND gate 176 previously mentioned.

The output of the R/2R ladder network 177 is connected to the non inverting input terminal of a buffer amplifier 178. The inverting input of the buffer amplifier 178 is connected to the output of this buffer amplifier 178. This output of the buffer amplifier 178 is also connected to one of the fixed terminals of a variable resistor 179, the other fixed terminal of which is connected to the ground. The signal at the variable terminal of the variable resistor 179 corresponds to the signal h shown in FIG. 3 and which is represented by the line h in FIG. 4II, and this signal h is supplied, via a resistor 180, to the inverting input of an amplifier 181. The output of the amplifier 181 is connected to the base terminal of a transistor 182, while the non inverting input of the amplifier 181 is connected, via a resistor 183, to the emitter of this transistor 182. Further, this emitter of the transistor 182 is also connected to the ground, via a resistor 184. A capacitor 185 is connected between the base and the collector of the transistor 182, and the signal present at the collector of the transistor 182, which corresponds to the signal designated by i in FIG. 3, and which is represented by the line i in FIG. 4.III, appears at an output terminal 186 of the computer 28, and is supplied via one of the lead wires 41 to the coil 23 of the air bleed flow rate control device 15. The other one of the lead wires 41 is connected, via a terminal 188 and an ignition key switch 190, to the positive pole of the battery 189 of the automobile to which this system is fitted. The negative pole of the battery 189 is of course grounded, and is connected to the ground input 187 of the computer 28.

The operation of this computer 28 will now be described.

The buffer amplifier 164, along with its associated resistor 162 and capacitor 163, change the high impedance of the input supplied from the oxygen sensor 29 to the input terminal 160 into a low impedance; in other words, they change a high voltage weak current electric signal produced from the oxygen sensor 29 into a relatively high current electric signal Vx, which corresponds to the signal a in FIGS. 3 and 4.I. The comparator 165 receives the signal Vx from the buffer amplifier 164 and also receives the set voltage Vr output at the variable terminal of the variable resistor 166, i.e. a voltage divided from the standard voltage Vc supplied thereto; this voltage Vr corresponds to the signal b in FIGS. 3 and 4.I. The comparator 165 produces a high level voltage output signal (i.e. a "1" signal) when Vx is greater than Vr or when Vx is equal to Vr, i.e. when the secondary air/fuel ratio present at the part of the exhaust manifold 4 of the internal combustion engine near the oxygen sensor 29 is smaller, i.e. richer, than a predetermined secondary air/fuel ratio which is determined by the setting of the variable resistor 166; and, on the other hand, produces a low level voltage output signal (i.e. a "0" signal) when Vx is less than Vr. Thus, the output signal of the comparator 165 is a "1"/"0" pulse signal, as shown by the line c in FIG. 4.II.

This pulse signal c is, as explained above, supplied both to the secondary air flow control circuit 38 and also to the primary air/fuel ratio computing circuit 39 whose construction has been described above.

In the secondary air flow control circuit 38, when its input, i.e. the signal c, is a high level or "1" signal, then an output signal, i.e. a driving signal for the secondary air flow rate control device 32, is produced, which increases the amount of the secondary air flow provided by the air pump 30 through the conduits 31 and 33; but, on the other hand, when the signal c is a low level or "0" signal, then the secondary air flow control circuit 38 produces an output signal which reduces the amount of the secondary air flow provided by the secondary air flow rate control device 32. This operation is, as has been said above, per se well known and conventional.

Within the primary air/fuel ratio computing circuit 39, the function is in general that, when the pulse signal c supplied to the U/D terminal of the up/down counter 170 is a high level or "1" signal, the up/down counter 170 counts upwards; and conversely, when the pulse signal c supplied to the U/D input terminal of the up/down counter 170 is a low level or "0" signal, then the up/down counter 170 counts downwards. This operation is in itself per se well known in the art. The rate of this upward counting and of this downward counting is controlled by the characteristic frequency defined by the capacitor 168 and by the resistor 169, in this embodiment, i.e. is controlled by the output frequency of the astable multivibrator 167.

The arrangement comprising the AND gates 175 and 176, the NAND gate 173 and the OR gate 174, and the five input AND gate 171 and the five input OR gate 172, is for preventing overflow and underflow of the up/down counter 170. In more detail, when neither all five digits of the output of the up/down counter 170 (which is a five digit counter, in this embodiment) present at the output terminals Q1, Q2, Q3, Q4, and Q5 thereof are "0," nor are said output digits all "1," then the output of the five way AND gate 171 is a "0" signal, and also the output of the five way OR gate 172 is a "1" signal. Accordingly, the output of the NAND gate 173 is a "1" signal, and also the output of the OR gate 174 is a "1" signal, when the input to the U/D terminal is "1," and therefore in this condition the output of the astable multivibrator 167 is connected, via the AND gate 175 and the AND gate 176, to the CL terminal of the up/down counter 170 at all times. Thus, the above described counting up and counting down by the up/down counter 170 takes place in a per se well known fashion.

On the other hand, when the up/down counter 170 is about to overflow upwards, i.e. when all of its five output digits present at the terminals Q1, Q2, Q3, Q4, and Q5 are "1," then the output of the five way AND gate 171 becomes a "1" signal. At this time, therefore, the output of the NAND gate 173 is a "1" signal only when the pulse signal c is in the low signal state or the "0" state, and when on the other hand the pulse signal 55 c is in the high signal state or the "1" state, then the output of the NAND gate 173 is a "0" signal, and the supplying of this "0" signal to one input of the AND gate 175 ensures that the transmission through this AND gate 175 of the "1" pulse signal output of the astable multivibrator 167 to the clock terminal CL of the up/down counter 170 is interrupted. Accordingly, from this condition, the up/down counter 170 can only count at times when the pulse signal c is in low signal level condition or "0" condition, i.e. is only allowed to count downwards.

Similarly, when the up/down counter 170 is about to overflow downwards, i.e. when all of its five output digits present at the terminals Q1, Q2, Q3, Q4, and Q5 are "0," then the output of the five way OR gate 172 becomes a "0" signal. At this time, therefore, the output of the OR gate 174 is a "1" signal only when the pulse signal c is in the high signal state or the "1" state, and when on the other hand the pulse signal c is in the low signal state or the "0" state, then the output of the OR gate 174 is a "0" signal, and the supplying of this "0" signal to one input of the AND gate 176 ensures that the transmission through this AND gate 176 of the "0" pulse signal output of the astable multivibrator 167 to the clock terminal CL of the up/down counter 170 is interrupted. Accordingly, from this condition, the up/down counter 170 can only count at times when the pulse signal c is in high signal level condition or "1" condition, i.e. is only allowed to count upwards.

In other words, the clock input terminal CL of the up/down counter 170 is always supplied with the clock signal produced by the astable multivibrator 167, except in the following two cases: when the input signal supplied to the U/D terminal of the up/down counter 170 is a "1" signal and in addition all of the digits of the output of the up/down counter 170 are "1;" and when the input signal supplied to the U/D terminal of the up/down counter 170 is a "0" signal and in addition all of the digits of the output of the up/down counter 170 are "0."

The R/2R ladder network 177 is a per se well known digital analog converter or D/A converter, which produces an output electrical signal voltage, at its output, which corresponds to the binary output from the up/down counter 170. The buffer amplifier 178 amplifies the analog electrical signal output of the R/2R ladder network 177; in other words, converts the high impedance of the output of the R/2R ladder network 177 into a low impedance, in the same manner as does the buffer amplifier 164 described previously. The output voltage Vy of the buffer amplifier 178 is divided by the variable resistor 179 to produce a voltage KVy. This electrical signal KVy corresponds to the signal h in FIGS. 3 and 4.III.

With regard to the primary fuel-air mixture control circuit 40 shown in FIG. 3, the function of this in the detailed circuit diagram shown in FIG. 5 is provided by the amplifier 181, by the associated resistors 180, 183, and 184, and by the transistor 182, which form a constant current circuit which produces a constant current output corresponding to the input voltage KVy. This output voltage, which corresponds to the output signal i in FIGS. 3 and 4.III, appears at the collector of the transistor 182. The capacitor 185 is for suppressing noise produced when a suddenly varying signal is supplied to the transistor 182. The load on the collector of the transistor 182 is provided by the coil 23 of the air bleed flow rate control device 15.

According to the operation of this circuit, when the pulse signal c output from the comparator 165 is a high signal level value or a "1" value, then the up/down counter 170 counts upward at each clock pulse received from the astable multivibrator 167, at a rate which is of course determined by the rate of production of clock pulses by this astable multivibrator 167 at this time. Similarly, when the pulse signal c output from the comparator 165 is a low signal value or a "0" value, then the up/down counter 170 counts downward at each clock pulse received from the astable multivibrator 167, again of course at a rate determined by the rate of production of clock signal pulses by the astable multivibrator 167 at this time. As explained above, these two rates need not in principle be the same; although, in the shown first preferred embodiment of the air/fuel ratio control system according to the present invention, they are the same.

Accordingly, when for example the duty ratio of the pulse signal c produced by the comparator 165 comes to be greater than the aforesaid equilibrium duty ratio value, which in the shown embodiment is 0.5, then in one full cycle of the pulse signal c the up/down counter 170 counts upwards by a total amount during the time when the pulse signal c is at high signal value or in "1" state, more than the total amount by which it counts downwards, during the time when the pulse signal c is at low signal value or in "0" state. In other words, the value in the up/down counter 170 is greater at the start of each cycle of the pulse signal c than it was at the start of the previous cycle of the pulse signal c. Thus, as shown by the appropriate portion of the line h in FIG. 4.II, the value of the signal h, which is an analog representation of the counted value in the up/down counter 170, gradually increases, at a rate determined by the rate of integration provided by the primary air/fuel ratio computing circuit 39 at this time; in other words, at a rate determined by the rate of production of clock pulses by the astable multivibrator 167 at this time. This may be seen between the time points $t_1'$ and $t_2$ in FIG. 4.II.

Therefore, as explained above, according to this gradual increase in the counted value in the up/down counter 170, the output voltage Vy of the buffer amplifier 178 gradually increases in a stepwise fashion, and accordingly the voltage KVy at the inverting input of the amplifier 181 also increases in a stepwise fashion, thereby gradually increasing the current received from the collector of the transistor 182 which is supplied to the coil 23 of the air bleed flow rate control device 15 at this time. Accordingly, as previously explained, the opening area of the valve port 21 exposed by the slide sleeve 22 coupled to the coil 23 is gradually and progressively increased, as may be seen from FIG. 2, in proportion to this current supplied to the coil 23, and accordingly the air bleed amount admitted through the air bleed passage 13 of the carburetor 2 to be mixed with the fuel which is being injected into the venturi 8 through the fuel nozzle 9 gradually increases, thereby progressively increasing the primary air/fuel ratio of the primary air-fuel mixture provided by the carburetor 2 to the internal combustion engine 1, i.e. progressively weakening this primary air-fuel mixture.

Accordingly, as the primary air/fuel ratio becomes progressively leaner, less and less secondary air will be required to be injected into the exhaust manifold 4 of the internal combustion engine 1 by the air pump 30 through the conduits 31 and 33 and through the secondary air flow rate control device 32, and thus the duty ratio of the pulse signal c output from the comparator 165 will gradually decrease, until this duty ratio becomes equal to the aforesaid equilibrium duty ratio value, at which time, as explained above, the value in the up/down counter 170 stops increasing, and accordingly the current supplied to the coil 23 of the air bleed flow rate control device 15 ceases to be increased, and therefore the opening area of the valve port 21 of the air bleed flow rate control device 15 exposed by the edge of the slide sleeve 22 mounted to the coil 23 is stabilized and ceases to increase, and the amount of air bleed provided to the air bleed passage 13 of the carburetor 2 is stabilized and ceases to increase. Thus, the operation of the internal combustion engine 1 is now stabilized with this new, increased air bleed amount.

On the other hand, when the duty ratio of the pulse signal c produced by the comparator 165 comes to be less than the aforesaid equilibrium duty ratio value, which in the shown embodiment is 0.5, then in one full cycle of the pulse signal c the up/down counter 170 counts upwards by a total amount during the time when the pulse signal c is at high signal value or in "1" state, less than the total amount by which it counts downwards during the time when the pulse signal c is at low signal value or in "0" state. In other words, the value in the up/down counter 170 is less at the start of each cycle of the pulse signal c than it was at the start of the previous cycle of the pulse signal c. Thus, as shown by the appropriate portion of the line h in FIG. 4.II, the value of the signal h, which is an analog representation of the counted value in the up/down counter 170, gradually decreases, at a rate determined by the rate of integration provided by the primary air/fuel ratio computing circuit 39 at this time; in other words, at a rate determined by the rate of production of clock pulses by the astable multivibrator 167 at this time. This may be seen between the time points $t_3'$ and $t_4$ in FIG. 4.II.

Therefore, as explained above, according to this gradual decrease in the counted value in the up/down counter 170, the output voltage Vy of the buffer amplifier 178 gradually decreases in a stepwise fashion, and accordingly the voltage KVy at the inverting input of the amplifier 181 also decreases in a stepwise fashion, thereby gradually decreasing the current received from the collector of the transistor 182 which is supplied to the coil 23 of the air bleed flow rate control device 15 at this time. Accordingly, as previously explained, the opening area of the valve port 21 exposed by the slide sleeve 22 coupled to the coil 23 is gradually and progressively decreased, as may be seen from FIG. 2, in proportion to this current supplied to the coil 23, and accordingly the air bleed amount admitted through the air bleed passage 13 of the carburetor 2 to be mixed with the fuel which is being injected into the venturi 8 through the fuel nozzle 9 gradually decreases, thereby progressively decreasing the primary air/fuel ratio of the primary air-fuel mixture provided by the carburetor 2 to the internal combustion engine 1, i.e. progressively enriching this primary air-fuel mixture.

Accordingly, as the primary air/fuel ratio becomes progressively richer, more and more secondary air will be required to be injected into the exhaust manifold 4 of the internal combustion engine 1 by the air pump 30 through the conduits 31 and 33 and through the secondary air flow rate control device 32, and thus the duty ratio of the pulse signal c output from the comparator 165 will gradually increase, until this duty ratio becomes equal to the aforesaid equilibrium duty ratio value, at which time, as explained above, the value in the up/down counter 170 stops decreasing, and accordingly the current supplied to the coil 23 of the air bleed flow rate control device 15 ceases to be decreased, and therefore the opening area of the valve port 21 of the air bleed flow rate control device 15 exposed by the edge of the slide sleeve 22 mounted to the coil 23 is stabilized and ceases to decrease, and the amount of air bleed provided to the air bleed passage 13 of the carburetor 2 is stabilized and ceases to decrease. Thus, the operation of the internal combustion engine 1 is now stabilized with this new, decreased air bleed amount.

In the operation of the above described control mechanism, the rate of variation of the opening area of the valve port 21 exposed by the edge of the slide sleeve 22, i.e. of the amount of bleed air provided to the air bleed passage 13 of the carburetor 2, with respect to time, may be made as small as desired, and accordingly the amount of variation of the primary air/fuel ratio of the primary air-fuel mixture provided by the carburetor 2 over one cycle of the pulse signal c may be made as small as desired, either by reducing the frequency of the clock pulses provided by the oscillation of the astable multivibrator 167, or alternatively by making the amount of increase of the current signal i for each count upwards or downwards of the up/down counter 170 small. Thereby, by making this characteristic rate of alteration of the primary air/fuel ratio of the primary air-fuel mixture supplied by the carburetor 2 to be a much slower change rate, than is the characteristic rate of change of the secondary air/fuel ratio of the exhaust gases within the exhaust manifold 4 of the internal combustion engine 1 caused by a change in the output signal of the oxygen sensor 29; in other words, by ensuring that the characteristic rate of the variation of the primary air/fuel ratio with respect to time is very much slower than the characteristic rate of the variation of the secondary air/fuel ratio with respect to time, even allowing for the fact that a change in the primary air/fuel ratio takes much longer to produce a change in the output value of the oxygen sensor 29 than does a change in the amount of secondary air injected through the secondary air injecting port 34 due to the much longer path which the primary air-fuel mixture must pursue through the combustion chambers of the internal combustion engine 1, thereby the basic or short term control operation performed by the oxygen sensor 29 is, in cooperation with the buffer amplifier 35, the comparator 36, and the secondary air flow control circuit 38, to regulate the secondary air/fuel ratio of the exhaust gases of the internal combustion engine 1 within the exhaust manifold 4; in other words, the above described function of gradual variation of the primary air/fuel ratio of the primary air-fuel mixture supplied by the carburetor 2, by varying the amount of air bleed provided to this carburetor 2 under the control of the air bleed flow rate control device 15, is a secondary or long term control operation superimposed upon the above specified basic or short term control operation, and operates over a much longer time scale.

In other words, by performing the control as described above, it is possible to adjust the primary air/fuel ratio of the primary air-fuel mixture provided by the carburetor 2 to the internal combustion engine 1, when it has been disturbed, back to a suitable somewhat richer than stoichiometric, but not over rich, primary air/fuel ratio, in a relatively mild manner.

By altering the rates of integration of the primary air/fuel ratio computing circuit 39, i.e. by altering the tangents of the angles of slope $x_1$ and $x_2$ of the signal h in FIG. 4.II, i.e. by making the rates of integration which are provided by counting upwards or counting downwards by the up/down counter 170 more or less different from one another, which alters the above defined equilibrium duty ratio value of the pulse signal c, it is possible to adjust the preferred primary air/fuel ratio of the air-fuel mixture provided by the carburetor 2 to the internal combustion engine 1. For example, when the internal combustion engine 1 is to be operated in an accelerating condition, or in a maximum load condition, then by adjusting these rates of integration properly it is possible to cause the overall primary air/fuel ratio level of the air-fuel mixture provided by the carburetor 2 to be rather richer than would be suitable for other operating conditions. This, as an example, would be done by causing the rate of integration provided by the up/down counter 170 when it is counting upwards, represented by the tangent of the angle $x_1$, to be substantially less, than the rate of integration provided by the up/down counter 170 when it is counting downwards, i.e. than the tangent of the angle $x_2$.

Now, a second preferred embodiment of the air/fuel ratio control system according to the present invention will be explained, in which the aforesaid rates of integration, i.e. the tangent of the angle $x_1$ and the tangent of the angle $x_2$ as shown in FIG. 4.II, are not the same. In other words, the operation of integration provided by the primary air/fuel ratio computing circuit 39 is asymmetrical.

Figure 6:
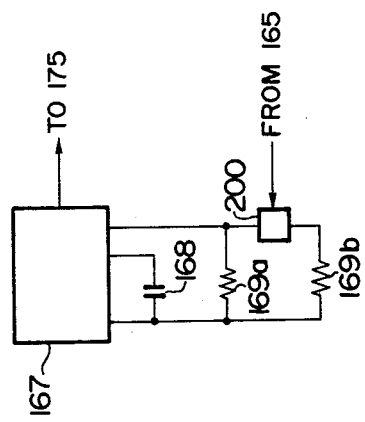
FIG. 6 is a view of a portion of the computer 28 of a second preferred embodiment of the air/fuel ratio control system according to the present invention, in which the rate of integration with respect to time performed by a primary air/fuel ratio correction circuit incorporated in the aforesaid computer 28 is different, when the signal it is integrating is at a high signal level value, from when said signal is at a low signal level value.

Referring to FIG. 6, there is shown therein the portion of the electric circuit diagram of the computer 28 of this second preferred embodiment which differs from the circuit diagram of the computer 28 of the first preferred embodiment shown in FIG. 5; the remainder of the construction of this second preferred embodiment of the present invention is identical to the construction of the first preferred embodiment described above.

As seen in FIG. 6, the astable multivibrator 167 is caused to oscillate at two different oscillating frequencies, i.e. is caused to provide clock pulse signals at two different production rates, according to whether the comparator 165 is producing a "1" signal or a "0" signal, i.e. according to whether the pulse signal c is at high or low signal level value. In more detail, the capacitor 168 connected across the terminals 1 and 3 of the astable multivibrator 167 is provided as in the first preferred embodiment shown in FIG. 5, and a resistor 169a is, as was the resistor 169 in the first preferred embodiment, connected between the terminals 2 and 3 of the astable multivibrator 167. However, in this second preferred embodiment, further, in parallel with the resistor 169a, there is connected the series connection of a second resistor 169b and an analog switch 200. The control input terminal of the analog switch 200, which may be, for example, an RCA integrated circuit serial No. CD4066, is connected to the output terminal of the comparator 165, i.e. is supplied with the pulse signal c.

According to the operation of this embodiment, when the output of the comparator 165 is a "1" signal, i.e. when the pulse signal c is in the high signal level state, then the analog switch 200 is in the ON state, and accordingly the resistors 169a and 169b are connected in parallel between the 2 terminal and the 3 terminal of the astable multivibrator 167. On the other hand, when the output of the comparator 165 is a "0" signal, in other words when the pulse signal c is in the low signal level state, then the analog switch 200 is in the OFF state, and accordingly the resistor 169b is disconnected, and only the resistor 169a is connected between the 2 terminal and the 3 terminal of the astable vibrator 167. Accordingly, when the output of the comparator 165 is in "1" state, i.e. when the pulse signal c is in high signal level value state, then the oscillation frequency of the astable multivibrator 167 is determined by the combination of the capacitor 168 and the parallel connection of the resistors 169a and 169b. On the other hand, when the output of the comparator 165 is a "0" signal, i.e. when the pulse signal c is in the low signal level state, then the oscillation frequency of the astable multivibrator 167 is determined by the combination of the capacitor 168 and the resistor 169a only. Therefore, the frequency of the clock signal produced by the astable multivibrator 167 for the counting of the up/down counter 170 is different, when the up/down counter 170 is counting upwards, from the frequency of the clock signal produced by the astable multivibrator 167 for the counting of the up/down counter 170, when said up/down counter 170 is counting downwards. Accordingly, therefore, the rate of change of the output voltage h of the primary air/fuel ratio computing circuit 39 with respect to time is not the same, when the pulse signal c is in the high signal level or the "1" state, as when the pulse signal c is in the low signal level or the "0" state; in other words, the tangent of the angle $x_1$ is not the same as the tangent of the angle $x_2$. That is to say, the rates of integration provided by the primary air/fuel ratio computing circuit 39 differ, according to whether the pulse signal c is in the high signal level value state or is in the low signal level value state.

Figure 8:
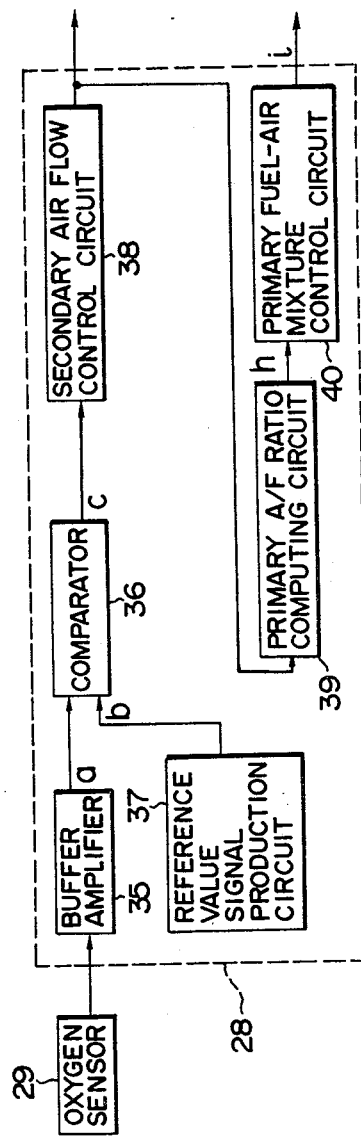
FIG. 8 is a block diagrammatical view, similar to FIG. 3, showing the internal structure of a computer 28 incorporated in a third preferred embodiment of the air/fuel ratio control system according to the present invention, in which the input signal to the aforesaid primary air/fuel ratio correction circuit is not, as before, taken from the output of the comparator 36, but is instead taken from the output signal of a secondary air flow control circuit 38, said signal also being sent to a secondary air supply system which controls feeding of secondary air into said exhaust system of said internal combustion engine, upstream of said oxygen sensor.

With reference to FIG. 8, a third preferred embodiment of the air/fuel ratio control system according to the present invention will now be described. In this figure, which is a block diagrammatical structural figure similar to FIG. 3, the difference is that the signal which is supplied to the primary air/fuel ratio computing circuit 39 is not the output signal c from the comparator 36, but is instead the output signal from the secondary air flow control circuit 38, which is also used for driving the secondary air flow rate control device 32. Since, generally speaking, as explained above, the duty ratio of this pulse signal, designated in FIG. 8 by b, varies according to variation in the primary air/fuel ratio of the air-fuel mixture produced by the carburetor 2 in approximately the same way as does the duty ratio of the pulse signal c in the first preferred embodiment of the air/fuel ratio control system according to the present invention shown in FIGS. 3, 4, and 5, thereby effectively the same form of control can be accomplished in effectively the same fashion. The details of the construction and operation of this third preferred embodiment of the air/fuel ratio control system according to the present invention will easily be conceived of by one skilled in the art, based upon the above explanations, and are therefore not given at length here, in the interests of brevity of description.

With reference to the second preferred embodiment of the air/fuel ratio control system according to the present invention, in that embodiment a simple circuit was shown for providing two different frequency values of oscillation of the astable multivibrator 167, according to whether the pulse signal c was at high signal level value state or was at low signal level value state. However, a more complicated circuit of this general nature may easily be conceived of by one skilled in the art, based upon the disclosure contained in this specification, in which the ratio between the rate of oscillation of the astable multivibrator 167 when the pulse signal c is in the high signal level value state, and the rate of oscillation of the astable multivibrator 167 when the pulse signal c is in the low signal level value state, which as explained above determines the preferred or target value of the primary air/fuel ratio supplied by the carburetor 2 to the internal combustion engine 1, may be varied, depending upon various engine operational conditions. This variation of the ratio of the upward integration rate and of the downward integration rate provided by the primary air/fuel ratio computing circuit 39 might, for example, be made either stepwise, or continuously. Thus, according to engine operational conditions, the preferred value for the primary air/fuel ratio of the air-fuel mixture provided to the internal combustion engine 1 by the carburetor 2 may be advantageously contrived to be varied.

The operation of the primary air/fuel mixture control circuit 40, comprising, in the above described embodiments, the amplifier 181, the transistor 182, etc., is not strictly necessary for the practice of the present invention. It would be possible directly to drive the air bleed flow rate control device 15 by the output signal of the digital/analog converter comprising the R/2R ladder network 177. In such a case, by correctly adjusting the rate of integration provided by the primary air/fuel ratio computing circuit 39, the rate of variation of the signal h with time could be correctly tailored so as to provide a proper slow variation of primary air/fuel ratio of the primary air-fuel mixture provided by the carburetor 2 to the internal combustion engine 1, even in this case where the air bleed flow rate control device 15 is driven by the signal h.

Further, according to other possible embodiments of the air/fuel ratio control system according to the present invention, it might be possible for the primary air/fuel ratio correction circuit, i.e. the primary air/fuel ratio computing circuit 39, to produce the primary air/fuel ratio control electrical signal in some way other than by direct integration of the secondary air flow control electrical signal supplied to it. Therefore, the present invention should not be conceived of as limited only to the possibility of this air/fuel ratio correction circuit detecting the integrated average value of the secondary air flow control electrical signal supplied to it, but other possibilities should be allowed for.

Also, the present invention should not be considered as limited to the possibility of the use of such a computing system as the part analog computing system described above. For example, the computer 28 shown in FIG. 5 might instead be embodied as a digital computer, and the various operations performed thereby could all be performed by subprograms within the digital computer.

Finally, control of the primary air/fuel ratio of the primary air-fuel mixture provided by the carburetor 2 could be provided not only by control of an amount of bleed air injected into a fuel passage of the carburetor, but also could be provided by direct regulation of the amount of fuel flow in one or more fuel channels of the carburetor, or indeed by the injection of air into the intake system of the internal combustion engine downstream of the carburetor.

Accordingly, although the present invention has been shown and described in terms of several preferred embodiments thereof, and in terms of the illustrative drawings, it should not be considered as limited thereto. As described above, various changes, modifications, and alterations of the detail of any particular embodiment may be made, without departing from the spirit of the present invention, or from its scope. Accordingly, it is desired that the scope of the present invention, and of the protection sought to be afforded by Letters Patent, should be defined, not by any of the perhaps purely fortuitous features of the shown embodiments, or of the drawings, but solely by the legitimate and proper scope of the appended claims, which follow.

We claim:

1. For an internal combustion engine comprising:
   (a) an intake system;
   (b) an exhaust system; and
   (c) a mixture supply device, which includes an air bleed system incorporating a bleed air flow control device and supplies primary fuel-air mixture to said intake system, the air/fuel ratio of said primary fuel-air mixture being increased as bleed air flow rate is increased;
an air/fuel ratio control system, comprising:
   (d) a source of secondary air;
   (e) a secondary air supply system, which includes a secondary air flow rate control device and conducts a controlled flow of secondary air from said source of secondary air to an intermediate portion of said exhaust system;
   (f) an exhaust gas oxygen sensor, which detects the concentration of oxygen at a measurement point of said exhaust system downstream of said intermediate portion at which the air from said secondary air supply system is supplied into said exhaust system, and which produces a first secondary air flow control electrical signal representative of said concentration of oxygen;
   (g) a buffer amplifier, which receives said first secondary air flow control electrical signal and produces a second secondary air flow control electrical signal representative of the air/fuel ratio of exhaust gases at said measurement point in said exhaust system;
   (h) a reference value signal production circuit, which produces a reference value electrical signal representative of a predetermined air/fuel ratio of exhaust gases such as a stoichiometric air/fuel ratio;
   (i) a comparator, which receives said second secondary air flow control electrical signal and said reference value electrical signal, compares these two electrical signals, and produces a rectangular wave electrical signal which changes between first and second levels according to plus or minus of the balance between said two electrical signals;
   (j) a secondary air flow control circuit, which receives said rectangular wave electrical signal, and produces a third secondary air flow control electrical signal for controlling said secondary air flow rate control device;
   (k) a primary air/fuel ratio computing circuit, which receives said rectangular wave electrical signal, and integrates portions of said rectangular wave electrical signal of said first level with a first time constant which provides a predetermined positive tangent of angle $x_1$ while integrating portions of said rectangular wave electrical signal of said second level with a second time constant which provides a predetermined negative tangent of angle $x_2$, said first and second time constants being so determined that, when the ratio of duration of said first level portion to the sum of durations of said first and second level portions in one cycle of said rectangular wave electrical signal is a selected value, an amount of integration by said first time constant is exactly cancelled by an amount of integration by said second time constant in one cycle of said rectangular wave electrical signal; and
   (l) a primary fuel-air mixture control circuit, which controls said bleed air flow control device according to the result of integration by said primary air/fuel ratio computing circuit so as to increase bleed air flow rate from a standard value according to a positive value of said result of integration and to reduce bleed air flow rate according to a negative value of said result of integration.

2. An air/fuel ratio control system according to claim 1, wherein said primary fuel-air mixture control circuit includes a smoothing circuit which produces such an electrical signal that is constant during one cycle of said rectangular wave electrical signal when said result of integration in a cycle just preceding to said one cycle is zero, that gradually increases during one cycle of said rectangular wave electrical signal when said result of integration in a cycle just preceding to said one cycle is positive, and that gradually decreases during one cycle of said rectangular wave electrical signal when said result of integration in a cycle just preceding to said one cycle is negative.

* * * * *